United States Patent [19]

Pharms et al.

[11] Patent Number: 4,844,985
[45] Date of Patent: Jul. 4, 1989

[54] ELECTRICALLY HEATED TRANSPARENT GLASS ARTICLE AND METHOD OF MAKING

[75] Inventors: Eugene P. Pharms, Detroit; Charles J. Amberger, Northville, both of Mich.; Ronald R. Hymore, Oregon, Ohio

[73] Assignee: Ford Motor Company, Dearborn, Mich.

[21] Appl. No.: 266,436

[22] Filed: Nov. 2, 1988

Related U.S. Application Data

[63] Continuation-in-part of Ser. No. 915,835, Oct. 6, 1986, abandoned.

[51] Int. Cl.$^4$ .......................... B32B 15/04; C09J 5/00
[52] U.S. Cl. ..................... 428/432; 428/699; 428/336; 156/99; 156/106; 156/319; 219/203; 427/419.3
[58] Field of Search ............... 156/99, 106, 319, 100; 427/419.3; 219/203; 428/426, 432, 699, 437, 469

[56] References Cited

U.S. PATENT DOCUMENTS

| | | | |
|---|---|---|---|
| 2,859,131 | 11/1958 | Watkins | 427/419.3 X |
| 3,076,727 | 2/1963 | Harwig | 428/432 |
| 4,465,736 | 8/1984 | Nishihara et al. | 428/332 |
| 4,543,466 | 9/1985 | Ramus | 219/203 |

Primary Examiner—Michael W. Ball
Assistant Examiner—Michele K. Yoder
Attorney, Agent, or Firm—Peter D. McDermott; Roger L. May

[57] ABSTRACT

In a transparent glass article comprising an electrically conductive, transparent, metal-based coating on a glass substrate and polyvinyl butyral material (PVB) bonded thereto, adhesion between the coating and the PVB is improved by a thin chromium-based film on the metal-based coating interfacing with the PVB. Adhesion is particularly improved in its resistance to exposure to UV radiation. In an electrically heated windshield application, the adhesion is improved by chromium-based film (24) between the metal-based coating (22) on a first glass template (12) and a PVB interlayer (26) mediate the first glass template and a second glass template (28). The glass article is produced according to a method aspect of the invention.

20 Claims, 1 Drawing Sheet

U.S. Patent  Jul. 4, 1989  4,844,985
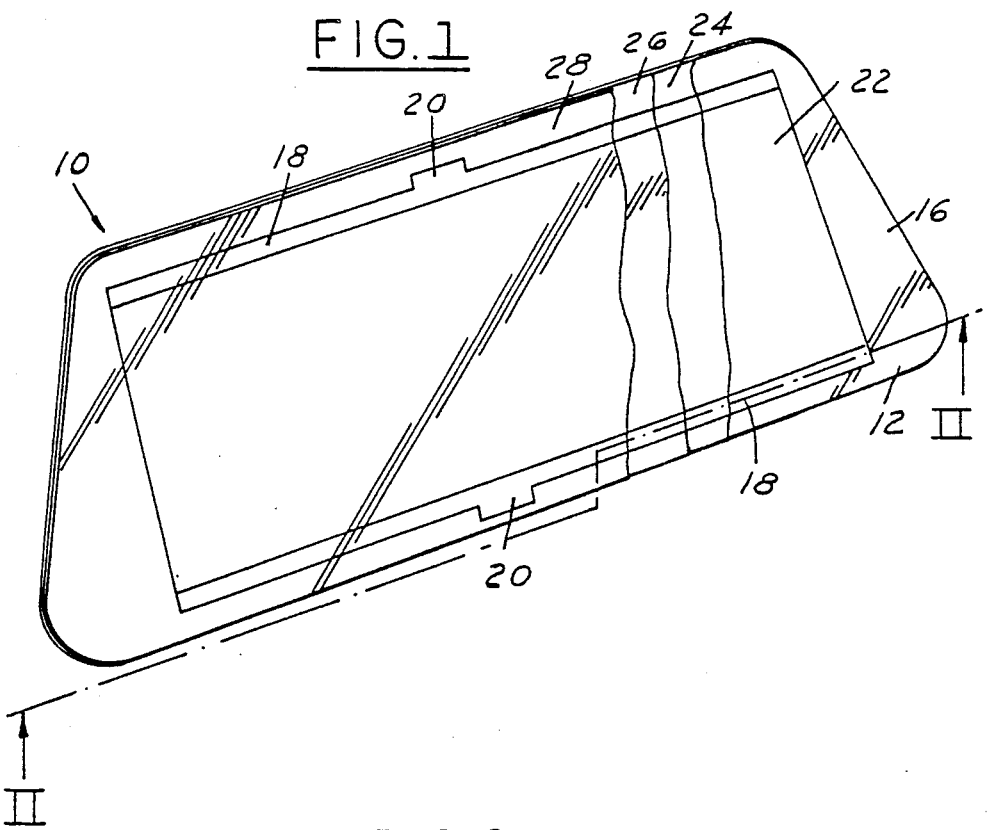
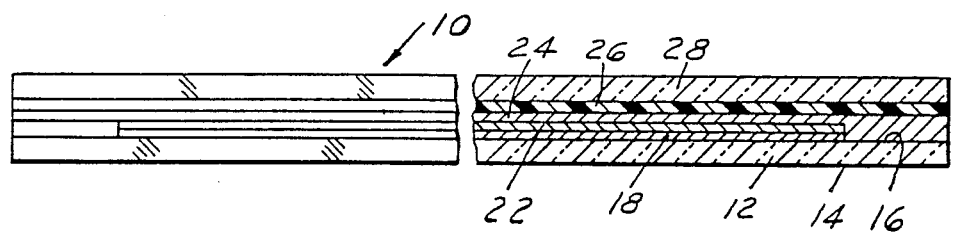

ELECTRICALLY HEATED TRANSPARENT GLASS ARTICLE AND METHOD OF MAKING

This application is a continuation-in-part of patent application Ser. No. 915,835 filed Oct. 6, 1986, now abandoned.

TECHNICAL FIELD

This invention is directed to improved adhesion between a coated glass substrate and polyvinyl butyral material laminated thereto. More particularly, the invention is directed to a transparent glass article, and to a method of making the same, having improved adhesion between an electrically conductive, transparent, metal-based coating on a glass substrate and such polyvinyl butyral material.

BACKGROUND OF THE INVENTION

It is known in the art to bond polyvinyl butyral material to a coated glass substrate, wherein the coating comprises an electrically conductive, transparent metal-based coating. Exemplary of this technology are heated glass vision units such as are known for use in motor vehicles as electrically heated windshields (hereinafter sometimes referred to as "an EHWS"). In an EHWS a layer of polyvinyl butyral material, typically polyvinyl butyral with such additives as plasticizers and the like, is laminated between a first, outboard glass template and a second, inboard glass template. The inside surface of a outboard glass template carries an electrically conductive, transparent, metal-based coating which directly contacts and is adhered to the polyvinyl butyral interlayer. As used herein the term "metal-based coating" means a coating which comprises, or a layer of which comprises, metal and metal oxide components. The term "transparent" is used herein to means substantially transparent to radiation in the visible wave length band. Substantially transparent means complying at least with applicable regulations, such as those applicable to motor vehicle windshields.

It is a recognized objective in the art to control and improve the adhesion at the interface of the coated glass substrate and the adhered polyvinyl butyral material. Thus, regarding particularly an EHWS, it is desirable to control and improve the adhesion of polyvinyl butyral material to the surface of the glass template which carries the electrically conductive, transparent, metal-based coating thereon. In this particular application and like applications wherein the polyvinyl butyral material is bonded to the coated glass substrate in a laminating operation using heat and pressure, the adhesion at such interface must be compatible with the laminating operation so as to be operative and effective in the laminated assembly.

Further, the adhesion must be durable in the environment in which the article will be used. It is now recognized to be desirable to increase the durability or stability of the polyvinyl butyral interfacial bond against the effects of prolonged exposure to UV radiation. A motor vehicle windshield, for example, typically is subjected to prolonged exposure to UV radiation as a component of sunlight. The mechanism by which prolonged exposure to UV radiation deteriorates the interfacial bond is not completely understood and, in part for this reason, there was prior to this invention no obvious means by which the UV radiation resistance of such interfacial bond could be increased. That is, prior to this invention there was no known or predictable, technologically feasible means to achieve increased resistance to UV radiation.

It is, therefore, an object of the present invention to improve the adhesion at the interface between polyvinyl butyral material and an electrically conductive, transparent, metal-based coating on a surface of a glass substrate. It is a particular object to improve the durability of such bond against exposure to UV radiation. This and other objects of the invention will be understood by the skilled of the art in the light of the following disclosure of the invention.

SUMMARY OF THE INVENTION

According to the present invention, a transparent glass article comprises:
  a glass substrate;
  an electrically conductive, transparent, metal-based coating on a surface of the glass substrate;
  a chromium-based film over the metal-based coating; and
  polyvinyl butyral material bonded to the glass substrate;
wherein the chromium-based film is immediately adjacent the polyvinyl butyral material.

According to a method aspect of the invention, a method of making the transparent glass article disclosed immediately above comprises the steps of:
  providing a glass substrate on a surface of which is carried on electrically conductive, transparent, metal-based coating;
  applying a chromium-based film onto the metal-based coating on the glass substrate; and
  bonding polyvinyl butyral material to the coated surface of the glass substrate.

As demonstrated by experiments, the procedure and results of which are detailed below, the chromium-based film is found to provide unexpectedly and unpredictably advantageous results. Specifically, the chromium-based film is found unexpectedly to provide improved resistance at the polyvinyl butyral/coated substrate interface against exposure to UV radiation. In particular, the durability of the adhesion at that interface, i.e. the resistance to exposure to UV radiation, is greatly improved over that provided by films of other materials which might have been speculated to provide comparable results. Thus, for example, with the chromium-based film of the invention the adhesion between polyvinyl butyral material and the electrically conductive, transparent metal-based coating of an electrically heated windshield has been found to show virtually no significant deterioration after hundreds of hours of exposure to UV radiation. In comparison, the adhesion of the same polyvinyl butyral material when a comparable zirconium oxide film was used significantly deteriorated after such UV radiation exposure. Similarly, the adhesion in the case of a comparable titanium oxide film was found also to be significantly deteriorated after such exposure to UV radiation.

It will be recognized by those skilled in the art in view of the present disclosure that the UV radiation resistance provided by the present invention is a highly significant advance in the art. This and additional advantages and other features of the invention will be better understood in the light of the following disclosure and discussion of preferred embodiments of the invention.

BRIEF DESCRIPTION OF THE DRAWINGS

The following disclosure and description of preferred embodiments of the invention will be understood in conjunction with the accompanying drawings, wherein like reference characters indicate like parts throughout the several figures and in which:

FIG. 1 is a schematic representation of an electrically heated windshield embodying the present invention to improve the adhesion between an electrically conductive, transparent, metal-based coating on the windshield and polyvinyl butyral material bonded thereto; and FIG. 2 is a cross-sectional view taken along line II—II of FIG. 1 showing various elements making up the electrically heated windshield.

DETAILED DESCRIPTION OF PREFERRED EMBODIMENTS

For purposes of illustrating the invention, the product and method aspects of the invention will be illustrated in the context of a glass vision unit specifically, an electrically heated windshield for a motor vehicle, wherein matched glass templates are laminated together with a polyvinyl butyral interlayer in a bonding operation employing heat and pressure in accordance with methods well known to the skilled of the art. While this description sets forth what presently is contemplated to be the best mode of both the product and method aspects of the invention, it is not intended to suggest or imply any limitation on the broader applicability of the principles of the invention or, correspondingly, on the true scope of the invention as defined in the appended claims.

An electrically heated windshield is a commercially significant application of the invention. As noted above and as is generally known in the art, an electrically heated windshield is a glass vision unit wherein an electrically conductive, transparent metal-based coating is carried on a surface of a first glass template adjacent a polyvinyl butyral interlayer laminated between the first glass template and a second glass template. As discussed in more detail below, the electrically heated windshield further comprises suitable bus bars and, optionally, other components. A preferred conductive coating of ran EHWS is actually a triple coating consisting of a zinc oxide film immediately adjacent the glass substrate, a middle film of silver, and another zinc oxide film over the silver film. The electrically conductive coating is connected to the aforesaid bus bars as is shown, for example, in U.S. Pat. No. 4,543,466 issued on Sept. 25, 1985, entitled "Bus Bar Arrangement For Uniformly Heating a Trapezoidally-Shaped Electrically Heated Windshield."

In applying the present invention to an EHWS, a chromium-based film is placed over the electrically conductive coating prior to the aforesaid laminating operation. The exact composition of the chromium-based film is not critical and, as will be readily recognized by the skilled of the art, is determined in part by the deposition process and by the process parameters employed in depositing the film. Even where the film is essentially pure chromium oxide, it generally will be a complex of chromium oxides: $CrO$, $CrO_2$, $CrO_3$ and $Cr_2O_3$. Also, a trace or greater amounts of chromium metal may be present in the film. Thus, the film may be a complex of chromium metal and the aforesaid chromium oxides. It has been found, however, that the use of chromium alone, while improving the adhesion of the interface with the polyvinyl butyral material, so adversely affected the light transmittance of the EHWS that it was no longer sufficiently transparent, that is, it was no longer "transparent" as that term is used herein.

Referring now to FIG. 1, there is seen an electrically heated windshield, generally identified by the numeral 10, manufactured in accordance with the present invention. In accordance with this preferred embodiment, an outer glass template 12 is provided which forms the outside of the electrically heated windshield 10. This outer glass template has an outwardly facing (outboard) surface 14 and an inwardly facing (inboard) surface 16. The outwardly facing surface 14 forms the outer surface of the electrically heated windshield 10. The outer glass template has a thickness of about 0.070 inch and is formed from a soda/lime glass in a known glass forming operation. The glass template may be bent if it is desired to have a curved windshield. Since the bending of glass templates is well known in the art, no further discussion thereof will be undertaken herein.

An electrically conductive coating and bus bar for the electrically heated windshield 10 of this invention in its preferred embodiment are applied to the inwardly facing surface 16 of the outer glass template 12. In this case, bus bars 18—18 and terminal areas 20—20 are made from a silver ceramic material in accordance with technology well known in the art. Generally, the silver ceramic in a suitable vehicle is silk screen printed on the inwardly facing surface 16 of the outer glass template 12 and then heated so as to bond the silver ceramic material to the glass and drive off the vehicle, thereby forming the bus bars 18—18 and the terminal areas 20—20. The silver ceramic areas generally have a thickness of about 0.001 inch.

The next coating applied to the inwardly facing surface 16 of the outer glass template 12 is a conductive coating 22. The conductive coating overlies and extends between the bus bars 18—18 over a great majority of the surface area of the outer glass template 12. The electrically conductive coating is preferably applied by a magnetron sputtering operation. This coating normally has a thickness of $4 \times 10^{-6}$ inch and in accordance with the teachings of this preferred embodiment of the invention, the materials used as target materials in the magnetron sputtering device are zinc and silver. The resulting coating 22 which is applied to the windshield is a multi-layer coating consisting of a layer of zinc oxide followed by a layer of silver followed by another layer of zinc oxide. The resulting metal-based coating is electrically conductive and, of course, transparent as it must be to function as a component of a motor vehicle windshield. By electrically conductive we mean that an electrical current, either AC or DC, can be passed across the silver coating. Electrical leads, not shown, are bonded to the terminal areas 20—20 so that the electrical energy may be applied to the conductive coating 22.

In accordance with the teachings of this invention, the adhesion between the conductive coating 22 and a layer of polyvinyl butyral material is improved by coating the conductive coating 22 with a chromium-based film, a thin layer of chromium oxide 24. Preferably, this coating is applied by a magnetron sputter coating operation which is carried out in a five micron oxygen atmosphere. This coating operation may be carried out right after the conductive coating 22 is placed on the inwardly facing surface 16 of the outer glass template. The nature and composition of the chromium-based film has been discussed above. Generally, this layer has a thickness in a range from about 25 angstroms to about 100 angstroms, which is in a range from $1\times10^{-7}$ inch to about $4\times10^{-7}$ inch. It is quite apparent, of course, that the chromium-based film must, in any event, leave the film covered EHWS transparent as that term is used herein. The chromium oxide layer 24 preferably covers all of the conductive coating 22, but it may, in fact, cover over the entire inwardly facing surface of the outer glass template. If desired, the chromium-based film may be applied by other means, such as chemical vapor deposition, electron beam evaporation or combinations thereof, as known in the art.

In finishing the electrically heated windshield 10, a layer of polyvinyl butyral material 26, having a thickness of about 0.030 inches is laid against the chrome oxide layer 24 and an inner glass template 28 is laid thereover. The bonding of the inner glass template 28 and the polyvinyl butyral interlayer 26 to the chromium-based film 24 and associated layers on the outer glass template 12 is carried out in a bonding operation which employs heat and pressure. As is well known in the art, the bonding operation employs heat and pressure which cures the polyvinyl butyral material and makes it transparent.

Suitable bonding operations may be carried out in oil or air autoclaves in which the autoclaving material is heated to a temperature in the range of 280°-310° F. and a pressure in the range from 200-300 lbs. per square inch. Generally, these higher pressures are applied for a period of 10-20 minutes during an autoclaving cycle which takes 45-60 minutes. Skilled artisans are familiar with the autoclaving of laminated windshields. The method of our invention for improving the adhesion between a coating on a glass article and a polyvinyl butyral material are intended to be carried out with normal autoclaving procedures. Its efficacy when used with alternative bonding operations will be apparent to the skilled of the art in the light of the present disclosure.

The degree of improvement of the adhesion between the polyvinyl butyral material to a surface of a glass article having an electrically conductive, transparent, metal-based coating thereon is demonstrated in the following test procedure.

The test procedure carried out is a so-called pummel test. In this test, a glass sample which has been laminated is exposed to a 0° F. atmosphere for a period of about two hours. The so-treated sample is then removed and subjected to a constant pummeling by means of a hydraulic hammer. In this test, if all of the glass falls off the polyvinyl butyral material, a reading of "0" is given to the test sample. If all of the glass is retained in bonding contact with the polyvinyl butyral material, a "10" is given to the test sample. These ratings are in accordance with standards established by a supplier of the polyvinyl butyral material, Monsanto Company, St. Louis, Missouri.

When this pummel test was carried out on test samples where the polyvinyl butyral material was not laminated against a chromium oxide layer 24 but rather was laminated directly to the conductive coating 22, the test samples registered a score in a range from 2.5-3.0 on this test. Identical samples processed in the same manner, but for the fact that the surface of electrically conductive film 22 carried chromium-based film 24, resulted in test results in a range of 6 to 8. This is a dramatic improvement in adhesion provided by the invention.

As disclosed above, the exact composition of the chromium-based film is not critical. Films within the meaning of that term have been found to be effective to increase the adhesion between the underlying metal-based coating and polyvinyl butyral material bonded thereto. In that regard, it will be appreciated by those skilled in the art, in the light of this disclosure, that referring simply to improved adhesion does not reveal the full complexity of the objective. It does not reveal completely the advantage and full significance of the present invention. The improved adhesion had to be achieved without impairing the transparency of the glass article. Thus, while experiments established that chromium (rather than the chromium-based film of the invention comprising chromium oxide) improved adhesion, it also impaired transparency. In the case of a windshield for a motor vehicle, this was, of course, unacceptable. Other materials were tried. In each case improved adhesion either was not achieved at all or was achieved in some measure but only with unacceptable adverse consequences.

Even more complexity and difficulty was involved in that the very nature or meaning of improved adhesion was not clear initially. This is dramatically illustrated in the Example below, wherein it is shown that the bond between polyvinyl butyral material and the electrically conductive, transparent, metal-based coating of the electrically heated windshield (as described above) actually is marginally less (although still sufficient) with the chromium-based film of the invention than with other materials which one might have predicted to be useful: zirconium oxide and titanium oxide. Less, that is, initially. Over time, however, more particularly after exposure to UV radiation, a significant advantage of this invention was discovered. The bond achieved with a chromium-based film of the invention is resistant to exposure to UV radiation. In contrast, those other materials did not show significant UV radiation resistance. Even now, it is not fully understood why the chromium-based film of the invention is so efficacious while those other materials are not.

EXAMPLE

A number of electrically heated windshields (EHWS) as described above were prepared with different candidate materials used and tested for adhesion improvement. Specifically, three 12 inch by 12 inch specimen EHWS were prepared. Each comprised (a) a first glass template having an outboard surface referred to as surface #1 and an inboard surface #2, (b) a second glass template having an outboard surface #3 and an inboard surface #4, (c) an electrically conductive, transparent, metal-based coating, specifically a zinc oxide/silver/zinc oxide system as described above, sputtered onto surface #2 of the first glass template, and (d) a polyvinyl butyral material (PVB) interlayer laminated between the glass templates (surfaces #2 and #3 facing the PVB).

Each of the three specimens further comprised an additional film sputtered over the zinc oxide/silver/zinc oxide system prior to the laminating operation. In the first the additional film was a 50 angstroms thick chromium-based film in accordance with the present invention. In the second a 50 angstroms thick film of zirconium oxide was used. In the third a 50 angstroms thick film of titanium oxide was used.

The specimens were cut and divided into 10 one inch by one inch samples plus a four inch by four inch sample (the periphery of each speciman was discarded). The four by four inch sample piece was tested at 0° F. at surface #2 for pummel adhesion value in accordance with the method well known to the skilled of the art and already described above.

The one inch by one inch samples were subjected to a compressive shear failure test according to techniques well known to the skilled of the art, wherein the EHWS were tested to failure, the pounds per square inch compressive shear pressure and the interface at which the failure occurred being recorded. Specifically, the samples of each specimen were divided into four subgroups. The subgroups were tested after different levels of exposure through surface #1 to UV radiation. The UV radiation exposure was carried out in an Atlas (tradename) Fadometer at full radiation level. The results are set forth in the table below wherein the abbreviations have the following meanings:

CSP - Compressive shear pressure (psi) at failure.
R - Range of CSP values for the tested subgroup.
CSFI - Interface at which shear failure occurred - in each case the PVB interface with either the film over the metal-based coating on surface #2 or the uncoated surface #3.
P - Pummel adhesion value.

Table of Test Results

| Fadometer U.V. Hours | | Chromium-based film (50Å) | Zirconium oxide film (50Å) | Titanium oxide film (50Å) |
|---|---|---|---|---|
| 0 | CSP = | 1907 | 2122 | 2022 |
| | R = | 1735–2140 | 1720–2325 | 1750–2215 |
| | CSFI = | surface #3 | surface #3 | surface #3 |
| | P = | 7 | 8 | 8 |
| 30 | CSP = | 2068 | 1292 | 1524 |
| | R = | 1825–2150 | 1745–2010 | 1330–1610 |
| | CSFI = | surface #3 | surface #2 | surface #2 |
| | P = | 7 | 7 | 3 |
| 100 | CSP = | 1924 | 1389 | 1160 |
| | R = | 1675–2035 | 1230–1500 | 1050–1375 |
| | CSFI = | surface #3 | surface #2 | surface #2 |
| | P = | 7 | 3.5 | 0.5 |
| 300 | CSP = | 2004 | 1239 | 1164 |
| | R = | 1600–2180 | 1070–1440 | 620–1330 |
| | CSFI = | surface #3 | surface #2 | surface #2 |
| | P = | 7 | 2 | 0.0 |

It is plainly shown in the above test results that only the chromium-based film of the invention provided good resistance to exposure to UV radiation. In the test specimens with the chromium-based film, the compressive shear failure (CSFI) occurred at the interface of the PVB with the plain glass surface #3, not at the interface of the PVB with the chromium-based film. In contrast, the test specimens with a zirconium oxide film and those with the titanium oxide film, following only 30 hours UV radiation exposure in the Fadometer (and at each higher level of exposure thereafter) failed instead at the interface of the PVB with those films.

In addition, the force needed to reach compressive shear failure (CSP) remained essentially constant for the chromium-based film test specimens, while that value fell sharply for the test specimens with a zirconium oxide or titanium oxide film.

Similarly, the pummel adhesion value (P) remained constant for the test specimens with a chromium-based film, while for the other materials it fall sharply—to zero in the case of titanium oxide. These results clearly establish both the effectiveness of the present invention and the unpredictability of that effectiveness.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention. For example, the method of this invention may be used to make coated laminated glass for architectural purposes. Such glass has a coating thereon for solar control purposes and is laminated to increase its strength.

We claim:

1. A transparent glass article comprising:
   a glass substrate;
   an electrically conductive, transparent, metal-based coating on a surface of said glass substrate;
   a chromium-based film over the metal-based coating; and
   polyvinyl butyral material bonded to said chromium-based film.

2. The transparent glass article of claim 1 wherein said chromium-based film consists essentially of chromium oxide.

3. The transparent glass article of claim 1 wherein said chromium-based film consists essentially of chromium oxide and chromium.

4. The transparent glass article of claim 1 wherein said metal-based coating comprises a first zinc oxide film immediately adjacent said glass substrate, a silver film over said first zinc oxide film and a second zinc oxide film mediate said silver film and said chromium-based film.

5. The transparent glass article of claim 1 wherein said chromium-based film is from about 25 angstroms to about 100 angstroms thick.

6. The transparent glass article of claim 1 wherein said article is an electrically heated windshield of a motor vehicle.

7. An electrically heated windshield for a motor vehicle, which windshield comprises:
   a first glass template having an outboard surface and an oppositely facing inboard surface;
   an electrically conductive, transparent, metal-based coating on said inboard surface of said first glass template, said metal-based coating comprising a first zinc oxide film immediately adjacent said inboard surface, a silver film over said first zinc oxide film and a second zinc oxide film over said silver film;
   a chromium-based film over said second zinc oxide film;
   a layer of polyvinyl butyral material substantially coextensive with said first glass template and having an outboard surface bonded to said chromium-based film; and
   a second glass template bonded to an inboard surface of said layer of polyvinyl butyral material.

8. The electrically heated windshield of claim 7 wherein said chromium-based film consists essentially of chromium oxide.

9. The electrically heated windshield of claim 7 wherein said chromium-based film consists essentially of chromium oxide and chromium.

10. The electrically heated windshield of claim 7 wherein said chromium-based film is from about 25 angstroms to about 100 angstroms thick.

11. An electrically heated windshield for a motor vehicle, which windshield comprises:
- a first glass template having an outboard surface and an oppositely facing inboard surface;
- an electrically conductive, transparent, metal-based coating on said inboard surface of said first glass template, said metal-based coating comprising a first zinc oxide film immediately adjacent said inboard surface, a silver film over said first zinc oxide film and a second zinc oxide film over said silver film;
- a chromium-based film consisting essentially of chromium oxide and chromium and being from about 25 to 100 angstroms thick over said second zinc oxide film;
- a layer of polyvinyl butyral material substantially coextensive with said first glass template and having an outboard surface bonded to said chromium-based film; and
- a second glass template bonded to an inboard surface of said layer of polyvinyl butyral material opposite said outboard surface of said layer.

12. A method of making a transparent glass article having improved adhesion between a coated glass substrate and a layer of polyvinyl butyral material, wherein said coated glass substrate comprises a glass substrate and an electrically conductive, transparent, metal-based coating on a surface of said glass substrate, which method comprises the steps of:
- (A) providing said coated glass substrate;
- (B) coating said metal-based coating of said coated glass substrate with a chromium-based film; and
- (C) bonding said polyvinyl butyral material to said coated glass substrate over said chromium-based film using heat and pressure.

13. The method of claim 12 wherein said chromium-based film consists essentially of chromium oxide.

14. The method of claim 12 wherein said chromium-based film consists essentially of chromium oxide and chromium.

15. The method of claim 12 wherein said metal-based coating comprises a first zinc oxide film immediately adjacent said glass substrate; a silver film over said first zinc oxide film and a second zinc oxide film over said silver film.

16. The method of claim 12 wherein said (B) step comprises coating said metal-based coating of said glass substrate with a chromium-based film about 25 to 100 angstroms thick.

17. The method of claim 12 wherein said article is an electrically heated windshield of a motor vehicle.

18. A method of improving the adhesion between a transparent and electrically conductive coating on a glass vision unit and polyvinyl butyral material which comprises the steps of:
- subjecting the transparent and electrically conductive coating on the glass vision unit to a coating operation in which a thin layer of chromium oxide is placed thereover; and
- bonding said chromium oxide coated glass vision unit to the polyvinyl butyral material in a bonding operation employing heat and pressure.

19. A method of making an electrically heated windshield for a motor vehicle, which method comprises the steps of:
- (A) providing a coated glass substrate comprising a first glass template and an electrically conductive, transparent, metal-based coating on an inboard surface of said first glass template, said metal based coating comprising a first zinc oxide film immediately adjacent said inboard surface, a silver film over said first zinc oxide film and a second zinc oxide over said silver film;
- (B) coating said metal-based coating of said coated glass substrate with a chromium-based film consisting essentially of chromium oxide and chromium and being about 25 to 100 angstroms thick;
- (C) laminating a layer of polyvinyl butyral material between said first glass template, said inboard surface thereof toward said layer of polyvinyl butyral material, and a second glass substrate, using heat and pressure.

20. A method of making an electrically heated windshield for a motor vehicle, which method comprises the steps of:
- (A) placing bus bars and an electrically conductive, transparent, metal-based coating on an inboard surface of said first glass template, said metal-based coating comprising a first zinc oxide film immediately adjacent said inboard surface, a silver film over said first zinc oxide film and a second zinc oxide over said silver film;
- (B) coating said metal-based coating of said coated glass substrate and a chromium-based film consisting essentially of chromium oxide and chromium and being about 25 to 100 angstroms thick;
- (C) laminating a layer of polyvinyl butyral material between said first glass template, said inboard surface thereof toward said layer of polyvinyl butyral material, and a second glass substrate, using heat and pressure.

* * * * *